(12) United States Patent
Imanishi (10) Patent No.: US 8,743,174 B2
(45) Date of Patent: Jun. 3, 2014

(54) DIGITAL CAMERA AND METHOD FOR CONTROLLING THE SAME

(75) Inventor: Kazutaka Imanishi, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 906 days.

(21) Appl. No.: 12/832,725

(22) Filed: Jul. 8, 2010

(65) Prior Publication Data

US 2011/0007133 A1 Jan. 13, 2011

(30) Foreign Application Priority Data

Jul. 9, 2009 (JP) .................................. 2009-162899

(51) Int. Cl.
*H04N 13/00* (2006.01)
*H04N 13/02* (2006.01)
*H04N 13/04* (2006.01)

(52) U.S. Cl.
CPC ....... *H04N 13/0296* (2013.01); *H04N 13/0239* (2013.01); *H04N 13/0246* (2013.01); *H04N 13/0055* (2013.01); *H04N 13/0497* (2013.01); *H04N 13/0059* (2013.01)
USPC .................... 348/42; 348/46; 348/47; 348/51

(58) Field of Classification Search
CPC .......... H04N 13/0296; H04N 13/0239; H04N 13/0246; H04N 13/0055; H04N 13/0497; H04N 13/0059
USPC ........................... 348/42–60, 207; 352/57–65
See application file for complete search history.

(56) References Cited

U.S. PATENT DOCUMENTS

| 3,269,291 | A | * | 8/1966 | Bernier ........................... 396/20 |
| 5,672,862 | A | * | 9/1997 | Ohara et al. .................. 250/204 |
| 7,586,534 | B2 | * | 9/2009 | Suto et al. ................. 348/333.09 |
| 2006/0051081 | A1 | * | 3/2006 | Ogino ............................. 396/55 |
| 2006/0127071 | A1 | * | 6/2006 | Takeuchi et al. ................ 396/55 |
| 2006/0152806 | A1 | * | 7/2006 | Noguchi et al. .............. 359/557 |

FOREIGN PATENT DOCUMENTS

| JP | 11-183951 A | 7/1999 |
| JP | 2002-359768 A | 12/2002 |
| JP | 2003-92768 A | 3/2003 |

* cited by examiner

*Primary Examiner* — Geepy Pe
(74) *Attorney, Agent, or Firm* — Birch, Stewart, Kolasch & Birch, LLP (57) ABSTRACT

A stereo camera is provided with two imaging units. A CPU detects a position of a CCD provided in each of the imaging units. Based on detection results, the CPU checks whether the CCD has reached an edge of a corresponding correctable area for each of the imaging units. The CPU starts to move the CCDs to their respective reference positions when one of the CCDs has reached the edge of the corresponding correctable area. The CPU controls actuations of CCD shifters such that the CCDs reach their respective reference positions simultaneously.

13 Claims, 12 Drawing Sheets

DIGITAL CAMERA AND METHOD FOR CONTROLLING THE SAME

FIELD OF THE INVENTION

The present invention relates to a digital camera using plural imaging units for obtaining plural images with parallax, and a method for controlling this digital camera.

BACKGROUND OF THE INVENTION

Digital cameras using plural imaging units are known. The digital camera or multi-eye camera obtains plural images with parallax and combines them into a stereoscopic (stereo) image or 3-D image in which illusion of depth is created. During image capture using such a digital camera, camera shake causes parallax deviations. To prevent such parallax deviations in stereo images, in Japanese Patent Laid-Open Publication No. 2003-092768, amounts of movements in plural images obtained with each of image units are calculated, and then each image is trimmed in accordance with the calculated amounts of movements.

However, the above described method results in poor pixel efficiency because apart of pixels is inevitably trimmed in each image, and therefore a stereo image using all the pixels obtained with imaging elements cannot be generated. Additionally, amounts to be trimmed vary according to the amounts of movements. As a result, the size of the generated stereo image may also differ from that intended.

To solve such problems, it is devised to provide an optical image stabilization mechanism or optical camera shake correction mechanism in each of the imaging units (see Japanese Patent Laid-Open Publications No. 11-183951 and No. 2002-359768). The optical image stabilization mechanism moves a shake correcting section or image stabilizing section, e.g. an image sensor or a correction lens, to physically adjust the optical axis. Thereby, parallax deviations caused by the camera shake are prevented. Trimming of the images obtained with the imaging units is no longer necessary. As a result, a stereo image using all the pixels is generated without unintended changes in the size of the stereo image.

For the optical image stabilization, it is required to return each of the shake correcting sections to a reference position (home position), e.g. an optical axis of the imaging unit, when the shake correcting section reaches an edge of a corresponding correctable area or the stereo camera is in the pan/tilt state, or when the power is turned on. In a case where the stereo camera uses an optical image stabilization mechanism, positions of the shake correcting sections during the shake correction may vary from each other. The shake correcting sections may return to their respective reference positions with different timings. As a result, a length of a stereo base may change, which causes the parallax deviations (errors in stereo matching). Such parallax deviations differ from those caused by operations of a user, e.g. camera shake, which may annoy the user in observing the stereo image.

SUMMARY OF THE INVENTION

An object of the present invention is to provide a digital camera for preventing parallax deviations with the use of an image stabilization mechanism or camera shake correction mechanism.

In order to achieve the above and other objects, a digital camera of the present invention includes a first imaging unit and a second imaging unit for capturing two images having parallax, a camera shake detector for detecting a camera shake, and a controller for controlling camera shake correction of the first and the second imaging unit to prevent parallax deviations in two images.

The first imaging unit includes a first corrector and a first shifter. The first corrector is movable within a plane orthogonal to an optical axis of the first imaging unit. The first shifter moves the first corrector from a first reference position and then returns the first corrector to the first reference position to correct the camera shake. The second imaging unit includes a second corrector and a second shifter. The controller controls the actuation of the first and second shifters such that each of the first and second shifters responds to a signal from the camera shake detector when the first corrector moves from the first reference position and the second corrector moves from the first reference position, and such that the first and second correctors simultaneously reach the first and second reference positions, respectively, in returning.

The first imaging unit further includes a first position detector for detecting a position of the first corrector. The second imaging unit further includes a second position detector for detecting a position of the second corrector. The controller controls the actuation of the first and second shifters based on the position of the first corrector detected by the first position detector and the position of the second corrector detected by the second position detector, respectively.

Each of the first and second imaging units has a taking lens and an image sensor. It is preferable that each of the first and second correctors is the image sensor. It is preferable that the first and second reference positions are optical axes of the first and second taking lenses, respectively. The camera shake detector is provided in each of the first and second imaging units to detect the camera shake of the corresponding imaging unit.

The digital camera further includes a limit judging section. The limit judging section judges whether the first corrector has reached an edge of a first correctable area in which the camera shake is correctable and whether the second corrector has reached an edge of a second correctable area in which the camera shake is correctable. When one of the first and second correctors is judged to have reached the edge of the corresponding correctable area, the controller actuates the first and second shifters to start returning the first and second correctors simultaneously.

The limit judging section has area data specifying each of the first and the second correctable areas. The limit judging section judges whether the first or second corrector has reached the edge of the first or second correctable area based on the position of the first corrector detected by the first position detector and the position of the second corrector detected by the second position detector, and the area data.

The controller temporarily sets the first and second correctors to the first and second reference positions via the first and second shifters, respectively, when the power is turned on.

A digital camera further includes a panning and tilting judging section for judging whether panning or tilting is being performed based on detection results of the camera shake detector. The controller keeps the first corrector at the first reference position via the first shifter and the second corrector at the second reference position via the second shifter while the panning and tilting judging section judges that the panning or tilting is being performed. The panning and tilting judging section judges that the panning or tilting is being performed when the camera shake detector detects a camera shake larger than a predetermined amount and in one direction for a predetermined time.

The controller calculates time series data for the first and second correctors. The time series data relates to positions, moving speeds, and acceleration of the first and second correctors from the start until the completion of the return based on the positions of the first and second correctors at the start of the return. The controller controls the actuation of the first and second shifters based on the calculated time series data.

A method for controlling a digital camera includes a camera shake detecting step, a camera shake correction step, a return start step, and a return completion step. In the camera shake correction step, a first corrector of the first imaging unit is moved from a first reference position and a second corrector of the second imaging unit is moved from a second reference position in accordance with the camera shake to correct the camera shake. Each of the first corrector and the second corrector moves within a plane orthogonal to an optical axis. In the return start step, when one of the first corrector and the second corrector has reached an edge of a correctable area, the first and second correctors simultaneously starts to return. In the return completion step, the first corrector is caused to reach the first reference position and the second corrector is caused to reach the second reference position simultaneously.

It is preferable that the method further includes the step of temporarily setting the first and second correctors to the first and second reference positions, respectively, when the power is turned on.

It is preferable that the method further includes the step of judging whether panning or tilting is being performed, and the step of keeping the first and second correctors at the first and second reference positions, respectively, while it is judged that the panning or tilting is being performed.

In the present invention, the first and second shifters are controlled such that the first and second correctors simultaneously reach the reference positions, respectively. As a result, parallax deviations caused by the first and second correctors reaching their respective reference positions at different timings are prevented.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 8 is flow chart showing steps for returning the first and second CCDs to their respective optical centers when the power is turned on;

DESCRIPTION OF THE PREFERRED EMBODIMENTS

Figure 1:
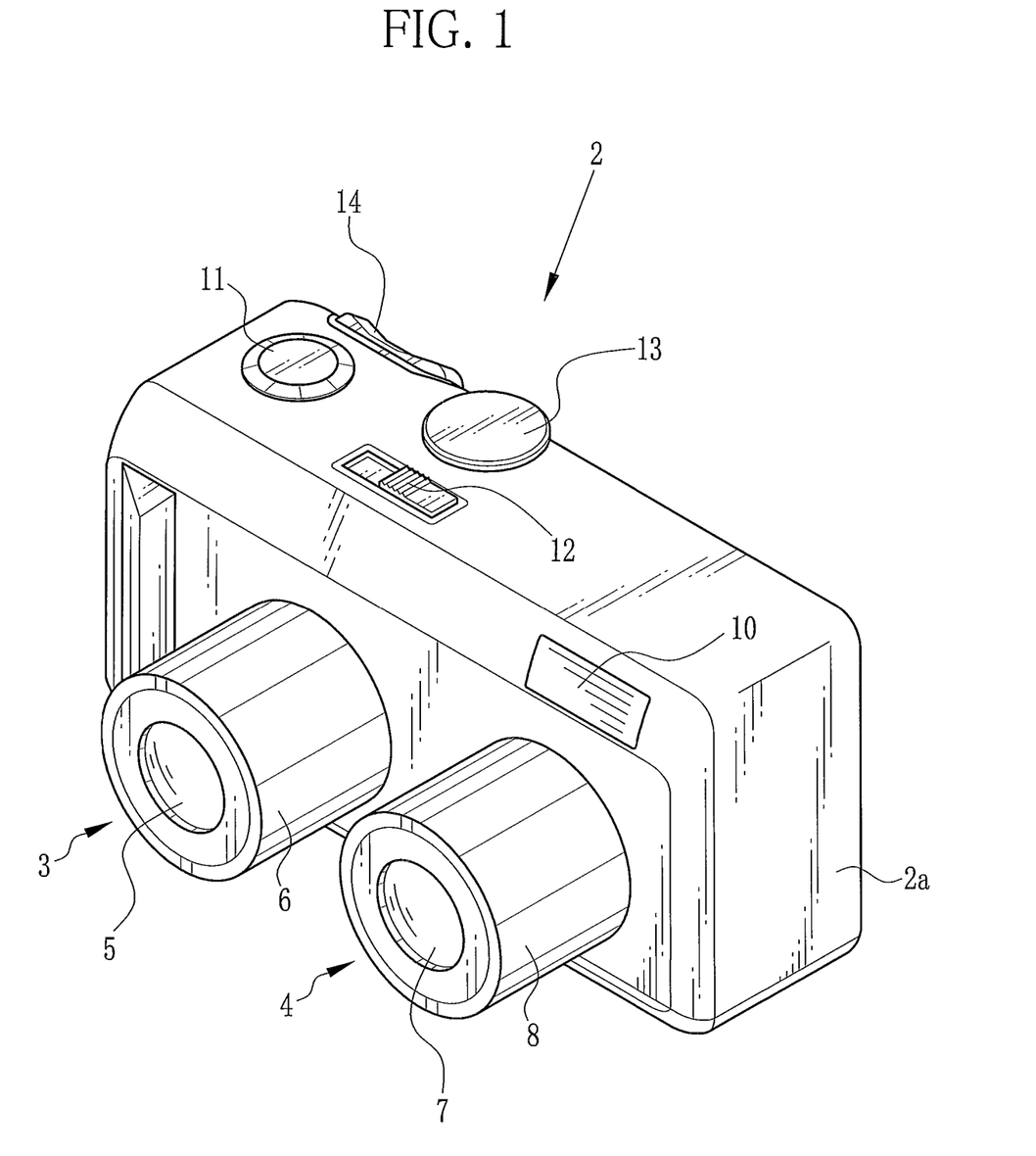
FIG. 1 is a perspective view of a stereo camera.

As shown in FIG. 1, a digital camera, for example, a stereo camera 2 is provided with a substantially box-shaped camera body 2a. The camera body 2a is provided with two imaging units, a first imaging unit 3 and a second imaging unit 4. The first imaging unit 3 has a first lens barrel 6. The second imaging unit 4 has a second lens barrel 8. The first and second lens barrels 6 and 8 are disposed parallel from each other on the front face of the camera body 2a. The stereo camera 2 simultaneously captures an image using each of the first and second imaging units 3 and 4 to obtain a pair of images (right image, left image) having binocular parallax. The pair of images is combined into a stereoscopic image (hereinafter referred to as stereo image), which creates illusion of depth.

The first lens barrel 6 incorporates a first taking lens 5. The second lens barrel 8 incorporates a second taking lens 7. When the power is turned off or during the reproduction of the obtained image, the lens barrels 6 and 8 are collapsed in storage positions, namely, the lens barrels 6 and 8 are contained inside the camera body 2a. During image capture, the lens barrels 6 and 8 are extended frontward from the camera body 2a to image capture positions. On the front face of the camera body 2a, a flash emitter 10 is provided. The flash emitter 10 emits a flash of light to illuminate a subject.

A release button 11 for instructing image capture, a power switch 12 for turning on and off the power, and a mode selection dial 13 for selecting a mode from plural modes are provided on a top face of the camera body 2a. The stereo camera 2 is provided with a still image mode for obtaining stereoscopic (stereo) still images, a movie mode for obtaining stereoscopic (stereo) moving images or stereo movie, and a replay mode for reproducing and displaying the obtained stereo images. One of the modes is selected by rotating the mode selection dial 13. In the still image mode, pressing the release button 11 instructs the image capture, which actuates the first and second imaging units 3 and 4 simultaneously. Thus, a stereo still image is obtained. In the movie mode, the release button 11 is pressed to actuate the first and second imaging units 3 and 4 simultaneously. When the release button 11 is pressed again during the imaging, the first and the second imaging units 3 and 4 stop imaging simultaneously. The images captured between the two pressings of the release button 11 are obtained as stereo moving images or stereo movie.

Figure 2:
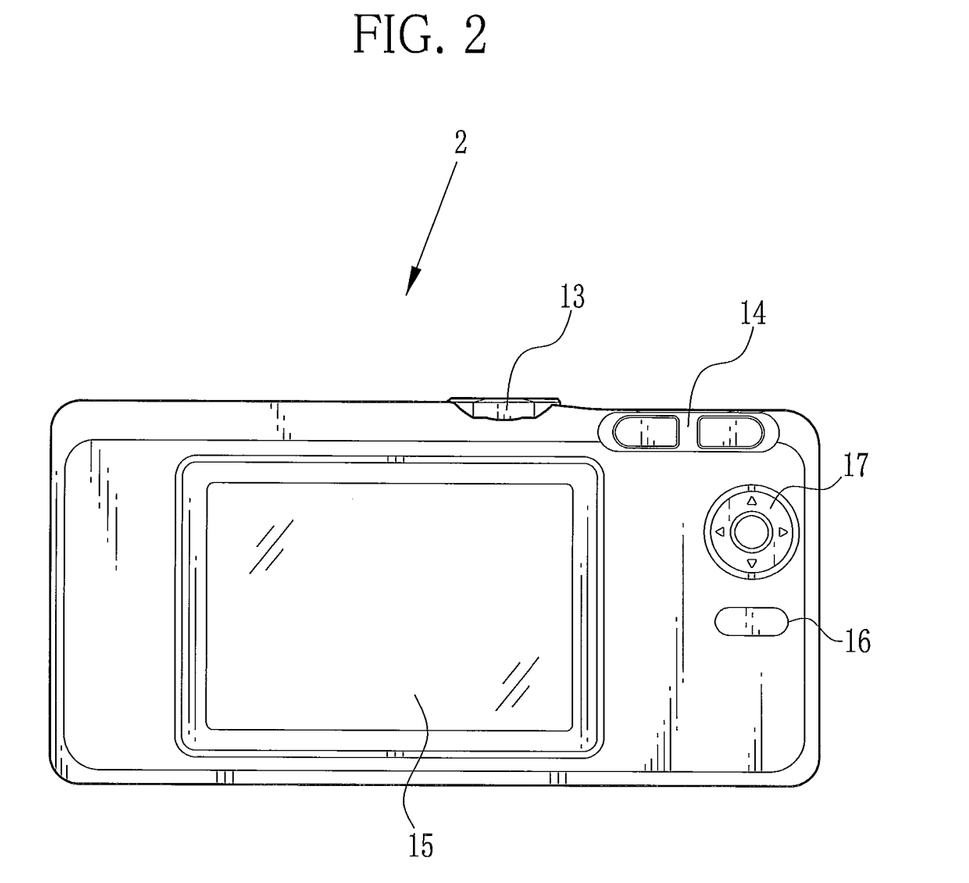
FIG. 2 is a back view of the stereo camera.

As shown in FIG. 2, a zoom button 14, an LCD 15, a menu button 16, and a cross key 17 are provided on the back of the camera body 2a. The zoom button 14 performs zoom operation in which the magnification of the first and second taking lenses 5 and 7 is changed to wide or tele. The LCD 15 displays the obtained stereo images, so-called through images during standby for image capture, and various menu screens. The menu button 16 is used for instructing the display of a menu screen. The cross key 17 is used for selecting a menu on the menu screen and for various settings.

The LCD 15 is a so-called 3-dimensional display, and provided with a lenticular lens on its surface. The LCD 15 allows a viewer to observe a stereo image displayed thereon with naked eyes.

Figure 3:
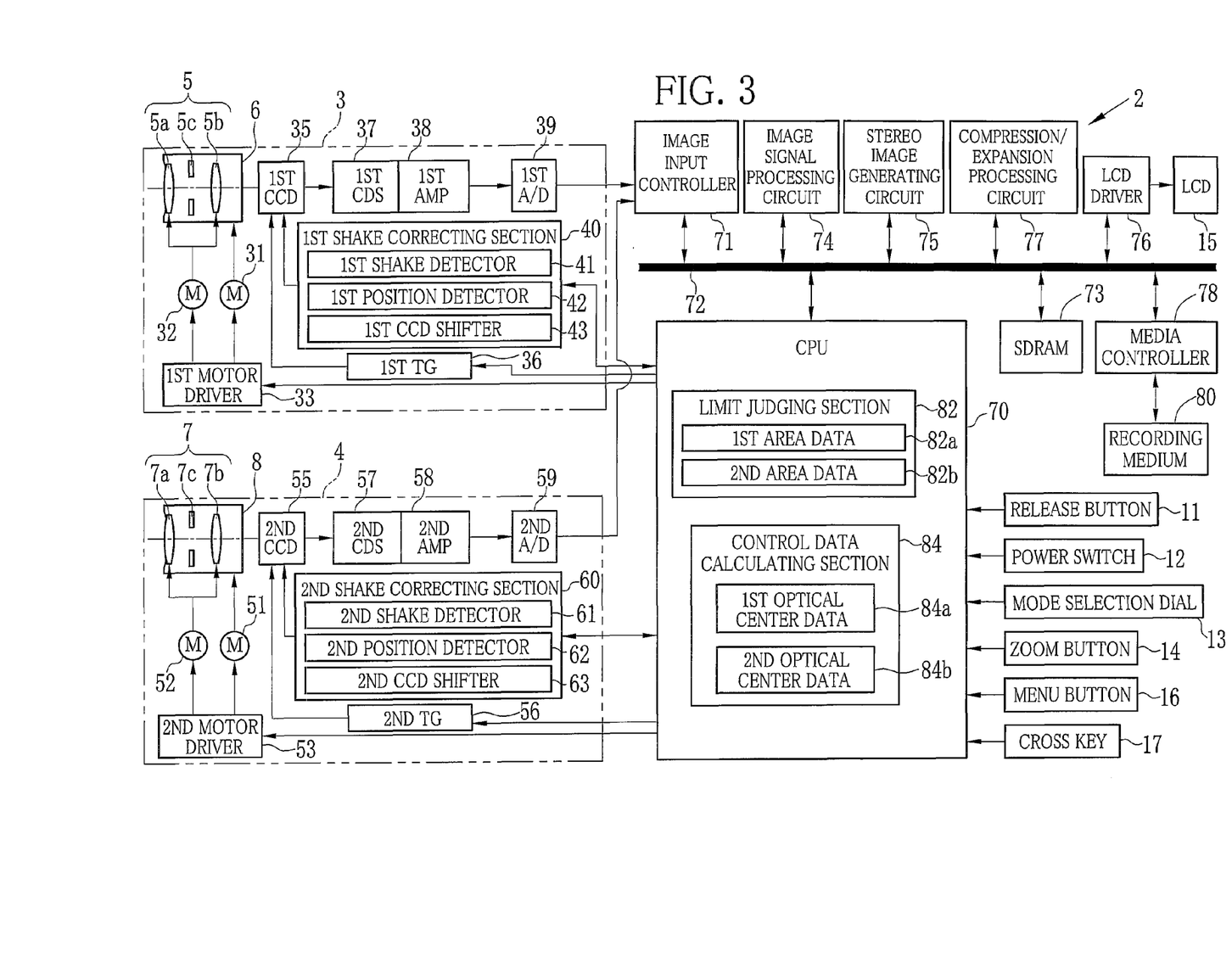
FIG. 3 is a block diagram schematically showing an internal configuration of the stereo camera.

As shown in FIG. 3, the first imaging unit 3 is composed of the first lens barrel 6, a first zoom motor 31, a first focus motor 32, a first motor driver 33, a first CCD (first image sensor) 35, a first timing generator (hereinafter abbreviated as TG) 36, a first CDS 37, a first AMP 38, a first A/D converter 39, and a first shake correcting section 40.

The first lens barrel 6 incorporates the first taking lens 5 and a first aperture stop 5c. The first taking lens 5 includes a first zoom lens 5a and a first focus lens 5b. The first zoom motor 31 drives the first lens barrel 6 to extend to the image capture position or collapse to the storage position and to perform zooming. The first focus motor 32 drives the first focus lens 5b to move along the optical axis direction. The first zoom motor 31 and the first focus motor 32 are connected to the first motor driver 33. The first motor driver 33 is connected to a CPU 70 that controls overall operation of the stereo camera 2. The first motor driver 33 drives the first zoom motor 31 and the first focus motor 32 in response to control signals from the CPU 70.

The first CCD 35 is situated behind the first taking lens 5. Through the first taking lens 5, an image of a subject is formed on a light receiving surface of the first CCD 35. The first CCD 35 is connected to the first TG 36. The first TG 36 is connected to the CPU 70. Under the control of the CPU 70, the first TG 36 inputs a timing signal (clock pulse) to the first CCD 35. In response to the timing signal, the first CCD 35 captures the image formed on the light receiving surface, and then outputs image signals of the captured image.

The image signals output from the first CCD 35 are input to the first CDS 37 which is a double correlated sampling circuit. The first CDS 37 outputs the image signals as R, G, and B image data precisely corresponding to accumulated charge in each cell of the first CCD 35. The image data output from the first CDS 37 is amplified in the first AMP 38, and then converted into digital data in the first A/D converter 39. The digital image data is output as right image data from the first A/D converter 39 to an image input controller 71.

The first shake correcting section 40 prevents parallax deviations in the stereo image caused by the camera shake during the image capture (errors in stereo matching). The first shake correcting section 40 realizes a camera shake correction function or image stabilizing function of a so-called image sensor shift method, namely, the first shake correcting section 40 moves the first CCD 35 in a direction to cancel out the camera shake. The first shake correcting section 40 is composed of a first shake detector 41, a first position detector 42, and a first CCD shifter 43. The first shake detector 41 is a gyrosensor, for example. The first shake detector 41 detects a shake of the first CCD 35 in vertical and horizontal directions, and then outputs the detection results to the CPU 70. The first position detector 42 is a linear encoder or a potentiometer, for example. The first position detector 42 detects a position of the first CCD 35 in vertical and horizontal directions, and then outputs the detected results to the CPU 70.

The first CCD shifter 43 is provided with a vertical actuator and a horizontal actuator (both not shown). The vertical actuator moves the first CCD 35 in a vertical direction. The horizontal actuator moves the first CCD 35 in a horizontal direction. The first CCD shifter 43 actuates the vertical and horizontal actuators in response to the shift signal from the CPU 70 to move the first CCD 35 in the vertical and horizontal directions. Based on the detection results of the first shake detector 41 and the first position detector 42, the CPU 70 generates a shift signal to move the first CCD 35 in a direction to cancel out the camera shake, and inputs the generated shift signal to the first CCD shifter 43. Thus, parallax deviations of the stereo image caused by the camera shake are prevented.

As with the first imaging unit 3, the second imaging unit 4 is composed of the second lens barrel 8, a second zoom motor 51, a second focus motor 52, a second motor driver 53, a second CCD (second image sensor) 55, a second TG 56, a second CDS 57, a second AMP 58, a second A/D converter 59, and a second shake correcting section 60. The second lens barrel 8 incorporates the second taking lens 7 and a second aperture stop 7c. The second taking lens 7 includes a second zoom lens 7a and a second focus lens 7b. The second shake correcting section 60 is composed of a second shake detector 61, a second position detector 62, and a second CCD shifter 63. These sections are the same as those of the first imaging unit 3, so that detailed descriptions are omitted. An image captured with the second CCD 55 and passed through the second CDS 57 and the second AMP 58 is input to the second A/D converter 59. In the second A/D converter 59, the image is converted into digital image data. The digital image data is output as left image data to the image input controller 71.

The image input controller 71 is connected to the CPU 70 via a data bus 72. Under the control of the CPU 70, the image input controller 71 stores image data, input from the imaging units 3 and 4, in an SDRAM 73. An image signal processing circuit 74 reads each image data from the SDRAM 73 and performs various processes, such as gradation conversion, white balance correction, and gamma correction, to the image data. Thereafter, the image data is stored in the SDRAM 73.

A stereo image generating circuit 75 reads from the SDRAM 73 right and left image data which have been subjected to various processes in the image signal processing circuit 74. The right and left image data is divided into rectangular images long in the vertical direction. The rectangular images are alternately arranged and combined. Thus, lenticular-lens-type stereo image data compliant with the LCD 15 is generated. This stereo image data is stored in the SDRAM 73.

An LCD driver 76 reads the stereo image data from the SDRAM 73, and then converts the stereo image data into an analog composite signal. Thereafter, the LCD driver 76 outputs the analog composite signal to the LCD 15. Thus, the stereo image is displayed as a through image on the LCD 15 and viewed with naked eyes.

A compression/expansion processing circuit 77 compresses the stereo image data in a predetermined format such as TIFF or JPEG. A media controller 78 accesses a recording medium 80 inserted in a media slot in a removable manner, and reads and writes compressed stereo image data to the recording medium 80.

Operation parts, namely, the release button 11, the power switch 12, the mode selection dial 13, the zoom button 14, the menu button 16, and the cross key 17 are connected to the CPU 70. These operation parts detect the operations performed by the user and input the detection results to the CPU 70. The release button 11 is a switch pressed in two steps. Half-pressing or lightly pressing the release button 11 performs various preparation processes such as focus adjustments of the first and second taking lenses 5 and 7 and exposure adjustments. With further pressing or fully pressing the half-pressed release button 11, image signals of one frame from each of the first and second imaging units 3 and 4 are converted into image data. The power switch 12 is a slide switch (see FIG. 1). When the power switch 12 is slid to the ON position, power of a battery (not shown) is supplied to each section of the stereo camera 2, which turns on the stereo camera 2. When the power switch 12 is slid to the OFF position, the power supply is stopped, which turns off the stereo camera 2.

When the operations of the power switch 12 and the mode detection dial 13 are detected, the CPU 70 drives the first and second zoom motors 31 and 51 to collapse or extend the lens barrels 6 and 8. When the operation of the zoom button 14 is detected, the CPU 70 drives the first and second zoom motors 31 and 51 in accordance with the operation of the zoom button 14 to move the first and second zoom lenses 5a and 7a forward or backward along the optical axis direction. Thus, zoom magnification is changed.

The CPU 70 actuates an autofocus mechanism (not shown) at a constant interval during imaging of through images or when the release button 11 is half-pressed. The autofocus mechanism drives the first and second focus motors 32 and 52 to move the first and second focus lenses 5b and 7b. While moving the first and second focus lenses 5b and 7b, the autofocus mechanism detects contrast of an image formed on each of the CCDs 35 and 55. Positions with the maximum contrast are detected as focus positions. The focus lenses 5b and 7b are set in the focus positions, respectively.

The CPU 70 is provided with a limit judging section 82 and a control data calculating section 84. The limit judging section 82 checks whether each of the first and second CCDs 35 and 55 has reached an edge of a corresponding correctable area (active area) within which the camera shake correction is possible. The control data calculating section 84 calculates control data used for returning the first and second CCDs 35 and 55 to their respective optical centers (reference positions). First area data 82a and second area data 82b are stored in the limit judging section 82. The first area data 82a specifies the correctable area of the first shake correcting section 40. The second area data 82b specifies the correctable area of the second shake correcting section 60.

Figure 4:
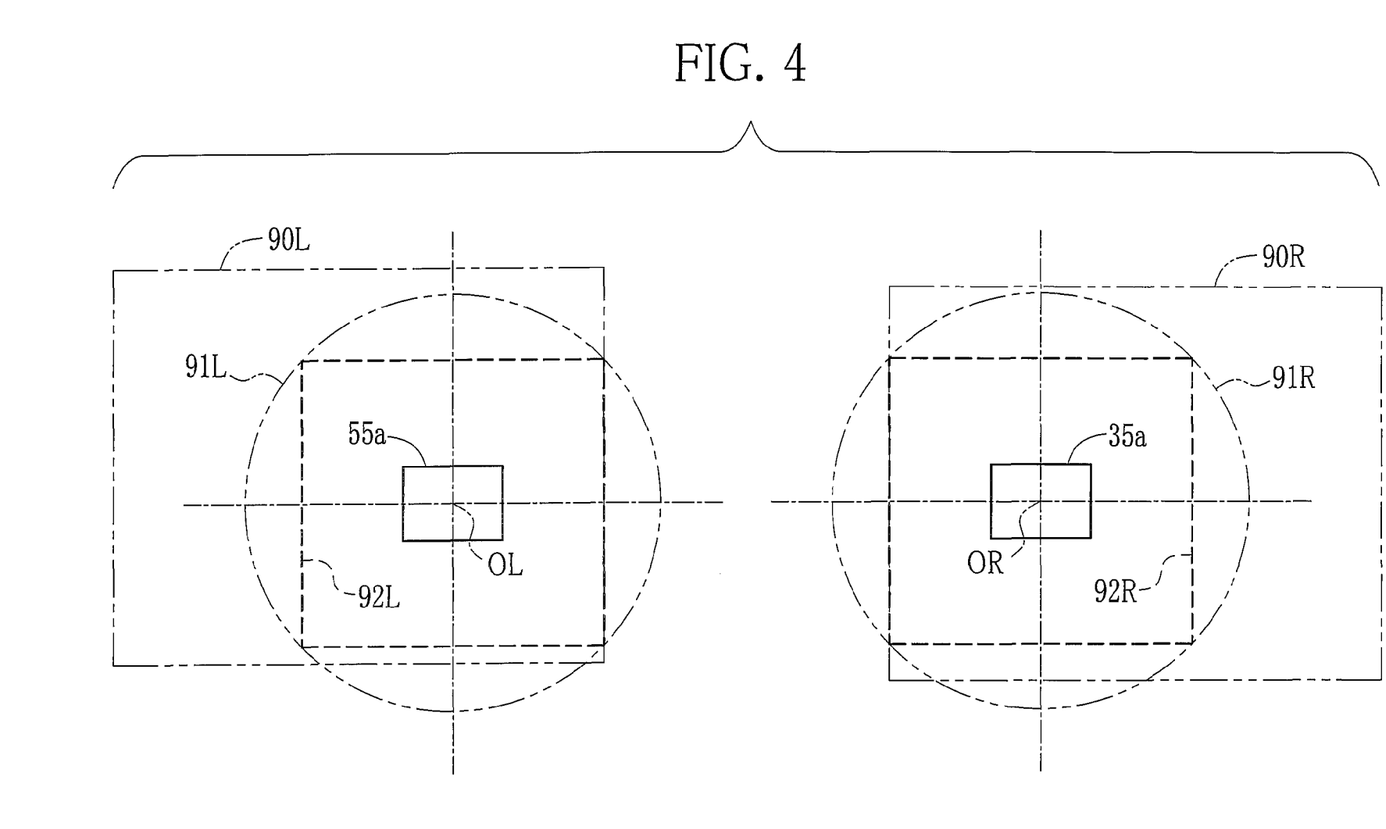
FIG. 4 is an explanatory view showing a correctable area of each imaging unit.

In FIG. 4, a numeral 35a indicates a light receiving surface 35a of the first CCD 35. A numeral 90R indicates a movable area 90R of the first CCD 35 driven by the first CCD shifter 43. A numeral 91R indicates an image circle 91R of an image formed with the first taking lens 5. A numeral 92R indicates a correctable area 92R of the first shake correcting section 40. A numeral 55a indicates a light receiving surface of the second CCD 55. A numeral 90L indicates a movable area 90L of the second CCD 55 driven by the second CCD shifter 63. A numeral 91L indicates an image circle 91L of an image formed with the second taking lens 7. A numeral 92L indicates a correctable area 92L of the second shake correcting section 60. "OR" and "OL" indicate optical centers of the first and second taking lenses 5 and 7, respectively. OR and OL are optical axes of the first and second taking lenses 5 and 7.

As shown in FIG. 4, the correctable area 92R is a substantially rectangular area in which the first CCD shifter 43 can move the first CCD 35 without causing vignetting on the light receiving surface 35a of the first CCD 35. The correctable area 92L is a substantially rectangular area in which the second CCD shifter 63 can move the second CCD 55 without causing the vignetting on the light receiving surface 55a of the second CCD 55. The first area data 82a is coordinate data specifying the correctable area 92R. The second area data 82b is coordinate data specifying the correctable area 92L.

To obtain the first and second area data 82a and 82b, for example, images are taken while the first and second CCD shifters 43 and 63 are driven to move the first and second CCDs 35 and 55 to each of the four corners of the movable areas 90R and 90L, respectively. Then, limits or thresholds at which vignetting occurs are located in the movable areas 90R and 90L to estimate the correctable areas 92R and 92L, respectively. Alternatively, the first and second area data 82a and 82b may be calculated based on design values of the first and second imaging units 3 and 4, respectively. In this case, as shown in FIG. 4, assembly errors and dimensional errors of the parts in the first and second imaging units 3 and 4 result in shape and positional variations of the correctable areas 92R and 92L. Accordingly, as described above, more precise first and second area data 82a and 82b are obtained from the images.

When generating the shift signals for the first and second CCD shifters 43 and 63 based on the detection results of the first and second shake detectors 41 and 61 and the first and second position detectors 42 and 62, the CPU 70 inputs the detection results of the first and second position detectors 42 and 62 to the limit judging section 82. When the detection results of the first and second position detectors 42 and 62 are input to the limit judging section 82, the limit judging section 82 checks whether the first and second CCDs 35 and 55 have reached edges of the correctable areas 92R and 92L, respectively. More specifically, the limit judging section 82 checks whether the position of the first CCD 35 is inside the correctable area 92R to judge whether the first CCD 35 has reached the edge of the correctable area 92R. The limit judging section 82 checks whether the position of the second CCD 55 is inside the correctable area 92L to judge whether the second CCD 55 has reached the edge of the correctable area 92L. Then, the limit judging section 82 outputs the judgment results.

When the first and second CCDs 35 and 55 are moved, only one of the first and second CCDs 35 and 55 may reach an edge of the corresponding correctable area 92R or 92L ahead of the other CCD due to variations in the correctable areas 92R and 92L, a difference between the detection amounts of the first and second shake detectors 41 and 61, or the like. If the other CCD is further moved while the CCD reached at the edge is stopped, the parallax deviations occur. To prevent this, the CPU 70 decides to start returning the first and second CCDs 35 and 55 to their respective optical centers when the limit judging section 82 judges one of the first and second CCDs 35 and 55 has reached an edge of the corresponding correctable areas 92R or 92L. When the CPU 70 decides to start returning the first and second CCDs 35 and 55 to their respective optical centers, the CPU 70 inputs the detection results of the first and second position detectors 42 and 62 to the control data calculating section 84 and instructs the control data calculating section 84 to calculate the control data using the detection results.

The control data calculating section 84 stores first optical center data 84a and second optical center data 84b. The first optical center data 84a specifies the position of the optical center OR of the first taking lens 5. The second optical center data 84b specifies the position of the optical center OL of the second taking lens 7. The control data calculating section 84 calculates the center position (reference position) of the correctable area 92R based on the first area data 82a to obtain the first optical center data 84a. Likewise, the control data calculating section 84 calculates the center position (reference position) of the correctable area 92L based on the second area data 82b to obtain the second optical center data 84b.

Figure 5:
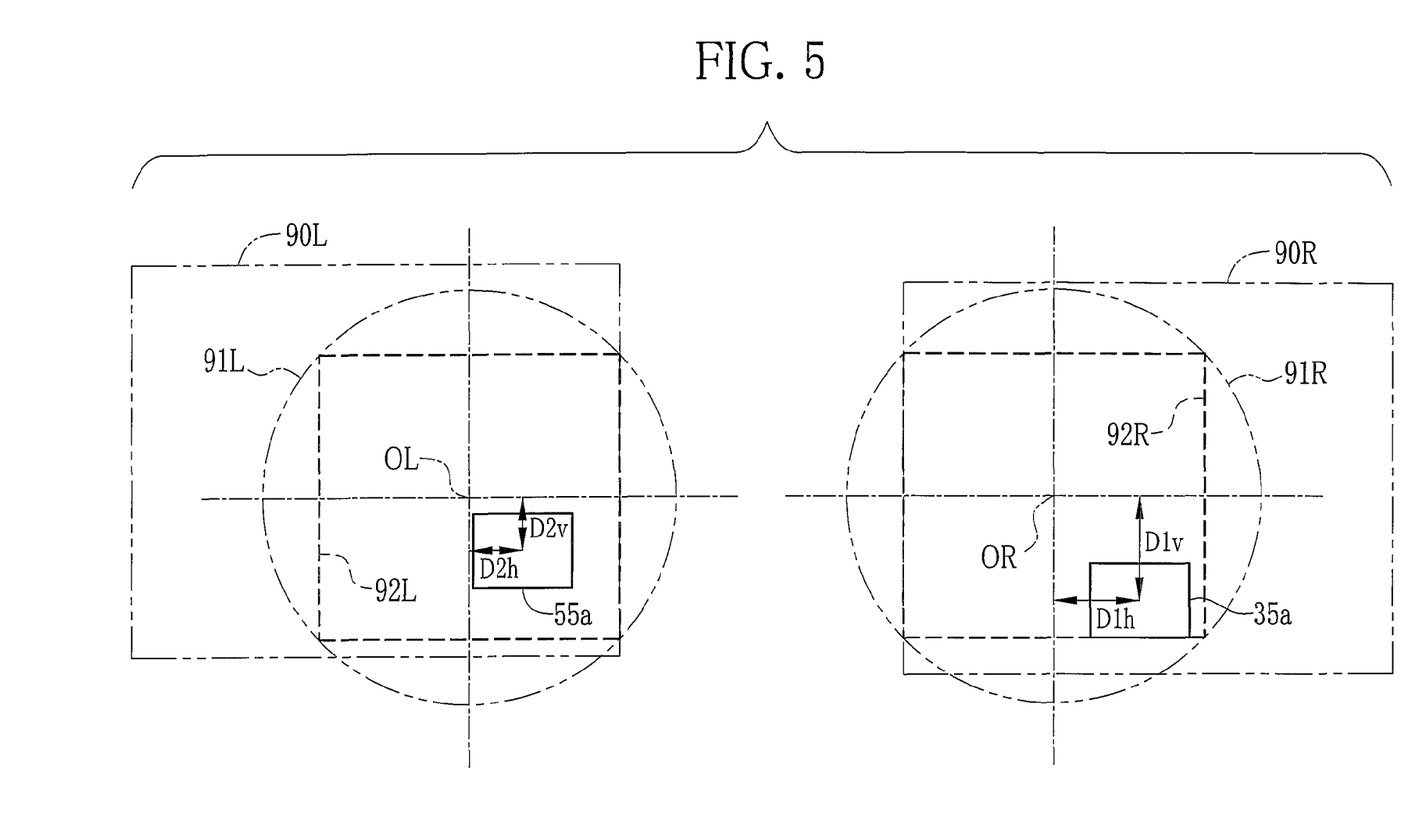
FIG. 5 is an explanatory view showing that a first CCD has reached an edge of a correctable area earlier than the second CCD.

As shown in FIG. 5, when the calculation of the control data is instructed, the control data calculating section 84 calculates distances $D1v$ and $D1h$ based on the first optical center data 84a and the detection results of the first position detector 42. Each of $D1v$ and $D1h$ specifies a distance or an amount of movement between a center of the light receiving surface 35a of the first CCD 35 and the optical center OR of the first taking lens 5. $D1v$ is a distance in a vertical direction, and $D1h$ is a distance in a horizontal direction. Likewise, the control data calculating section 84 calculates distances $D2v$ and $D2h$ based on the second optical center data 84b and the detection results of the second position detector 62. Each of $D2v$ and $D2h$ specifies a distance or an amount of movement between a center of the light receiving surface 55a of the second CCD 55 and the optical center OL of the second taking lens 7. D2$v$ is a distance in a vertical direction, and D2$h$ is a distance in a horizontal direction.

As shown in FIG. 5, in the case where the stereo camera 2 is placed in a slanting position such that a correction amount of the first CCD 35 is larger than that of the second CCD 55, so that the first CCD 35 reaches the edge of the correctable area 92R before the second CCD 55 reaches the edge of the correctable area 92L, the distances D1$v$ and D1$h$ become longer than the distances D2$v$ and D2$h$, respectively. Then, if the first and second CCDs 35 and 55 are returned to their respective optical centers OR and OL at the same speed, the second CCD 55 with the shorter distances reaches the optical center OL before the first CCD 35 reaches the optical center OR. In other words, the first and second CCDs 35 and 55 return to their respective optical centers at different timings. Such timing variations of the first and second CCDs 35 and 55 cause the parallax deviations in the stereo image.

Figure 6A:
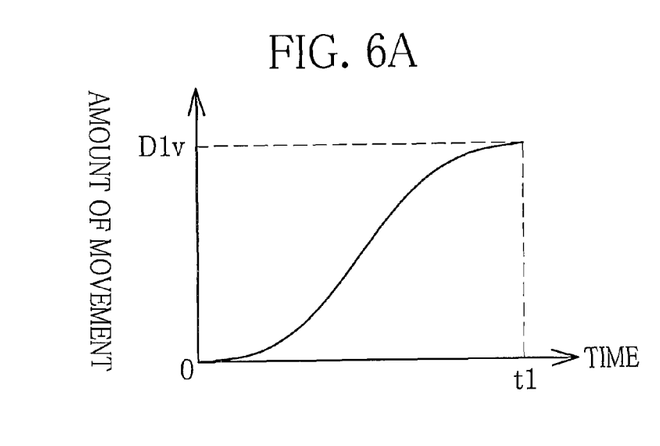
FIGS. 6A to 6D are explanatory views showing an example of control data interpolated from a reference path.
Figure 6B:
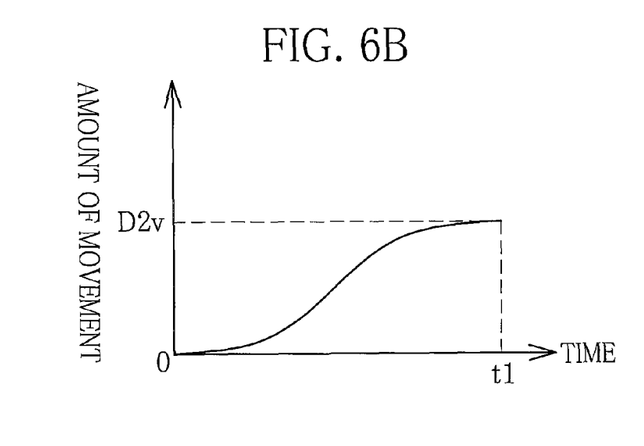
Figure 6C:
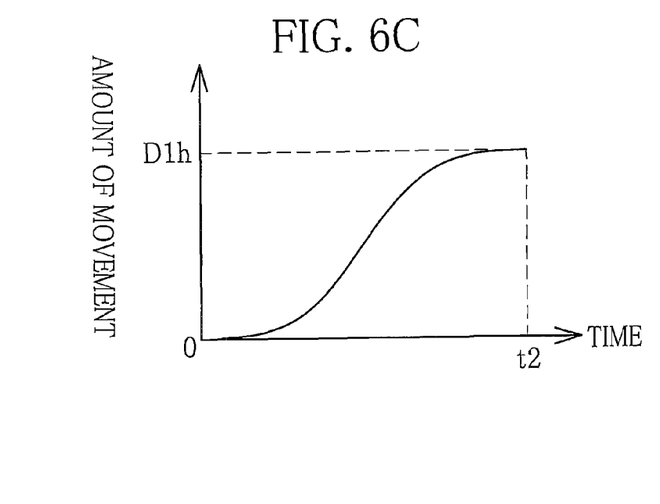
Figure 6D:
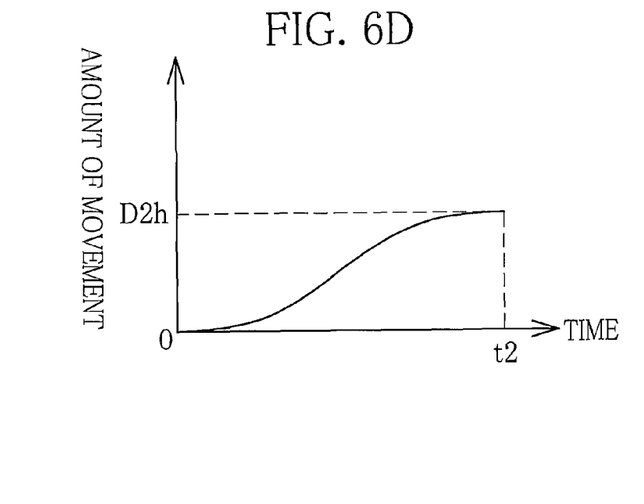

As shown in FIGS. 6A and 6B, to prevent the timing variations, the control data calculating section 84 calculates the control data for moving the first CCD 35 by D1$v$ [mm] in t1 [second] in the vertical direction and the control data for moving the second CCD 55 by D2$v$ [mm] in t1 [second] in the vertical direction. Likewise, as shown in FIGS. 6C and 6D, the control data calculating section 84 calculates the control data for moving the first CCD 35 by D1$h$ [mm] in t2 [second] in the horizontal direction, and the control data for moving the second CCD 55 by D2$h$ [mm] in t2 [second] in the horizontal direction. Thus, the control data calculating section 84 calculates each of the control data such that the first and second CCDs 35 and 55 reach their respective optical centers simultaneously.

For example, the time t1 is calculated using a mathematical expression t1=D/$V_{ave}$. "D" is the longer of the distances D1$v$ and D2$v$, and $V_{ave}$ is an average moving speed of the first CCD 35 or the second CCD 55 depending on the performance of the first CCD shifter 43 or the second CCD shifter 63, respectively. In other words, the time t1 is calculated as an average moving time for the first CCD 35 or the second CCDs 55 to move across the longer of D1$v$ or D2$v$. Likewise, the time t2 is calculated as an average moving time for the first CCD 35 or the second CCDs 55 to move across the longer of the distances D1$h$ and D2$h$. The times t1 and t2 may be previously set at predetermined values within which the first and second CCDs 35 and 55 can be returned to the optical centers by the first and second CCD shifters 43 and 63 even if the distances (D1$v$, D2$v$, D1$h$, or D2$h$) are at their highest values, namely, even if the first and second CCDs 35 and 55 are positioned at corners of the correctable areas 92R and 92L, respectively.

The control data calculated by the control data calculating section 84 are time-series data indicating the amounts of movement of the first and second CCDs 35 and 55 with time. As shown in graphs of FIGS. 6A to 6D where the horizontal axis represents time and the vertical axis represents the amount of movement, the control data calculating section 84 generates reference paths, for each of the first and second CCDs 35 and 55, through which positions, moving speeds, and accelerations are continuous from the start until the completion of the return. The control data as the time-series data is obtained by interpolation of the reference path. As shown in each of FIGS. 6A to 6D, the control data may be depicted by a cubic function curve in which the amounts of movement are small immediately after the start and immediately before the completion of the return, for example. Thereby, the first and second CCDs 35 and 55 move smoothly without abnormal noise. Any method can be used for calculating the control data as long as the method is capable of generating time-series data interpolated from a reference path from which a position, a moving speed, and acceleration can be obtained using differentiation. Examples for the calculation methods of the control data include cubic spline, Bézier curves, minimum jerk trajectory, and sextic function approximation.

After the calculation of each of the control data, the control data calculating section 84 outputs the calculated control data to the CPU 70. After receiving the control data, the CPU 70 generates the shift signals for the first and second CCD shifters 43 and 63 based on the received control data. The CPU 70 inputs the generated shift signals to the first and second CCD shifters 43 and 63. Thereby, the first and second CCDs 35 and 55 move along paths defined by their respective control data, and reach their respective optical centers simultaneously.

Figure 7:
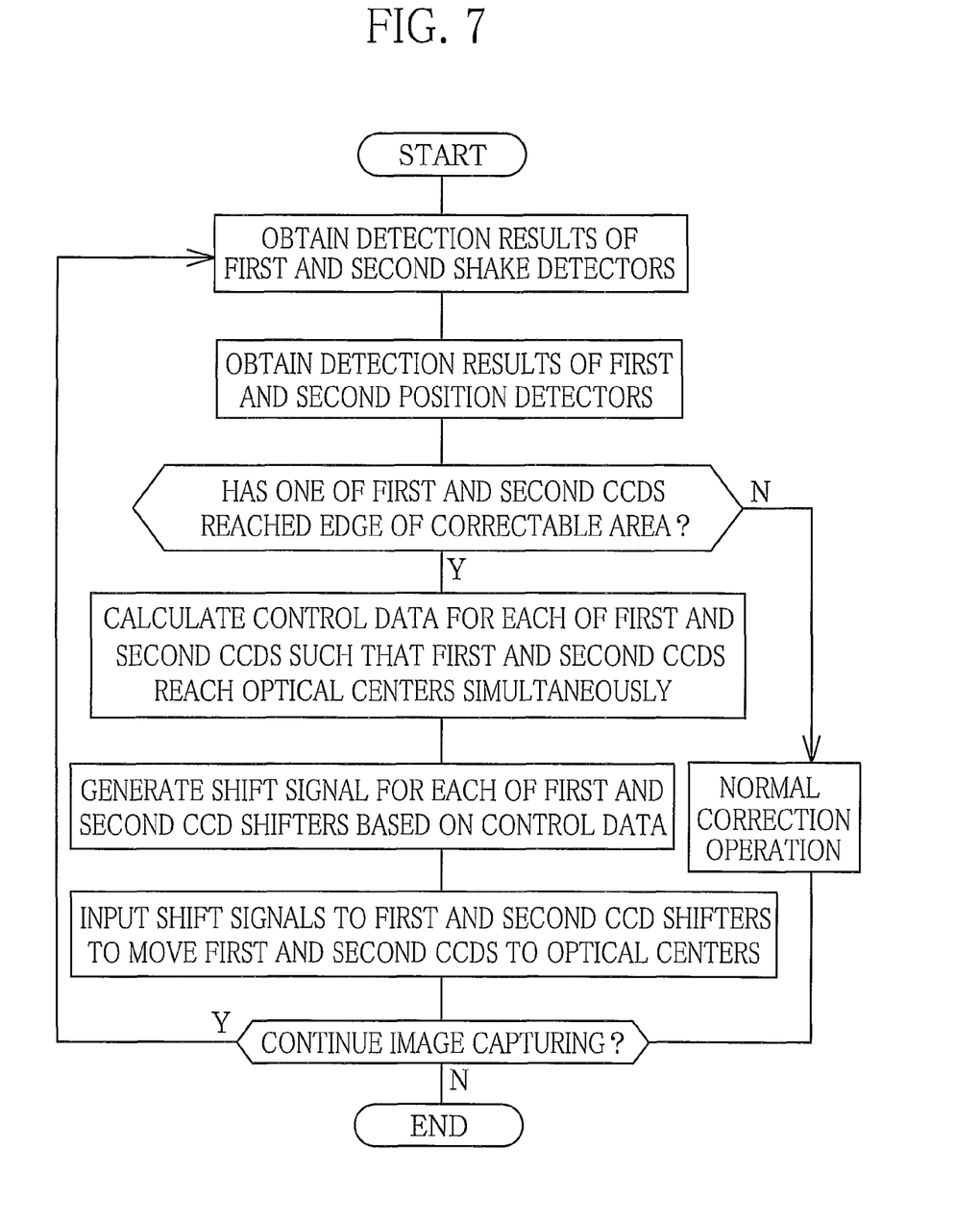
FIG. 7 is a flow chart showing operation steps of the stereo camera.

Next, with referring to a flowchart in FIG. 7, an operation of the stereo camera 2 having the above configuration is described. When the power switch 12 is slid to the ON position to actuate the stereo camera 2, and the stereo camera 2 is set in the still image mode or the movie mode, a stereo image as a through image is displayed on the LCD 15. In the still image mode and the movie mode, detection results of the first and second shake detectors 41 and 61, and detection results of the first and second position detectors 42 and 62 are input to the CPU 70. Based on the input detection results, the CPU 70 generates shift signals for moving the first and second CCDs 35 and 55 to their respective directions to cancel out the camera shake. The generated shift signals are input to the first and second CCD shifters 43 and 63. Thus, the parallax deviations in the stereo image caused by the camera shake (errors in stereo matching) are prevented, which is referred to as normal correction.

When the detection results of the first and second shake detectors 41 and 61 and the first and second position detectors 42 and 62 are input to the CPU 70, the CPU 70 inputs the detection results of the first and second position detectors 42 and 62 to the limit judging section 82. The limit judging section 82 checks whether the first CCD 35 has reached the edge of the correctable area 92R and whether the second CCD 55 has reached the edge of the correctable area 92L, and outputs these detection results.

When the limit judging section 82 judges one of the first and second CCDs 35 and 55 has reached the edge of the corresponding correctable area 92R or 92L, the limit judging section 82 decides to start moving the first and second CCDs 35 and 55 to their respective optical centers. The CPU 70 inputs the detection results of the first and second position detectors 42 and 62 to the control data calculating section 84 and instructs the control data calculating section 84 to calculate the control data.

When the calculation of the control data is instructed, the control data calculating section 84 calculates the control data for the vertical and horizontal directions for each of the first and second CCDs 35 and 55 such that the first and second CCDs 35 and 55 reach their respective optical centers simultaneously. After the calculation, the CPU 70 generates shift signals for the first and second CCD shifters 43 and 63, and inputs the generated shift signals to the first and second CCD shifters 43 and 63.

Thereby, the first and second CCDs 35 and 55 move along their respective paths in accordance with the shift signals, and reach their respective optical centers simultaneously. Thus, the parallax deviations of the stereo image caused by a time lag of the first and second CCDs 35 and 55 in reaching the optical centers are prevented. In addition, each control data is calculated such that the positions, moving speeds, and accelerations of the corresponding CCD change continuously to move the first and second CCDs 35 and 55 to their respective optical centers smoothly. As a result, the movements of the first and second CCDs 35 and 55 do not generate abnormal noise.

After the CPU 70 returns the first and second CCDs 35 and 55 to their respective optical centers, the CPU 70 starts over the above described steps, and repeats the steps until the power is turned off or the reproduction mode is selected.

Figure 8:
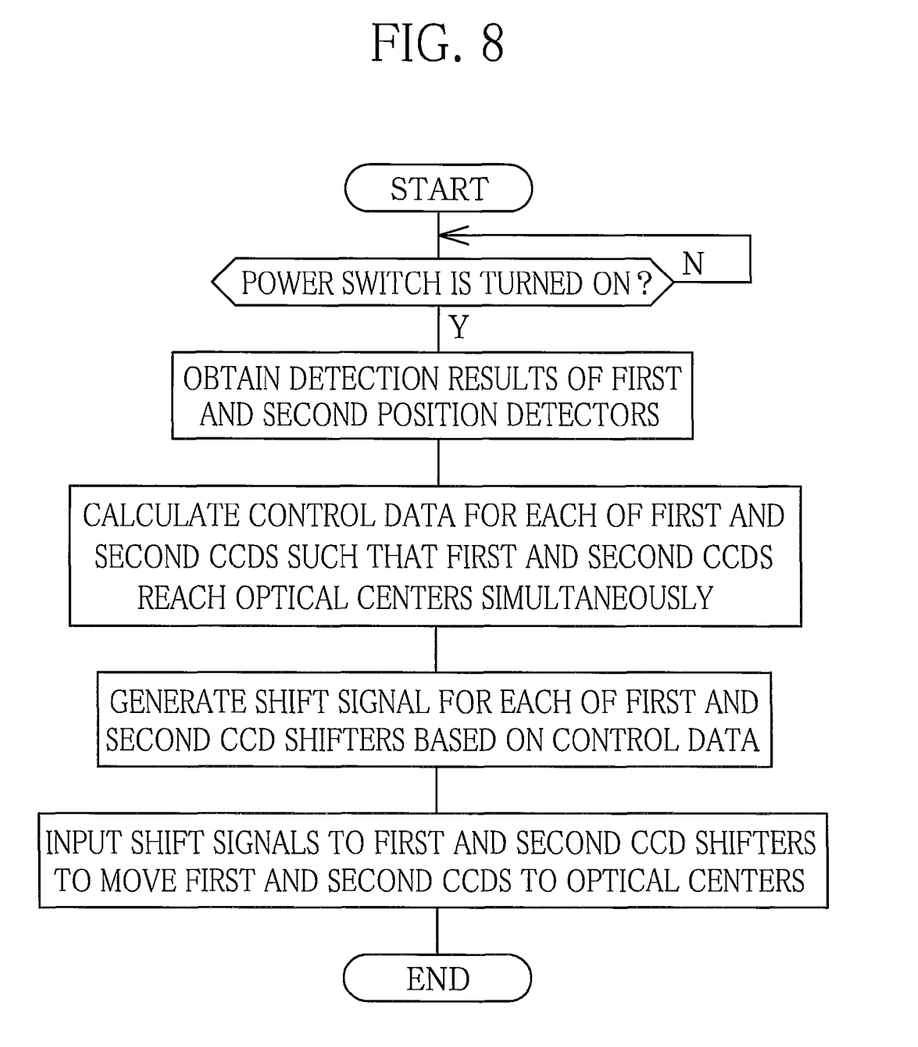

Next, with referring to a flowchart of FIG. 8, a second embodiment of the present invention is described. When the power switch 12 is slid to the ON position and the stereo camera 2 is actuated, the CPU 70 obtains the detection results of the first and second position detectors 42 and 62. Thereafter, the CPU 70 inputs the detection results to the control data calculating section 84, and instructs the control data calculating section 84 to calculate the control data. Hereinafter, the first and second CCDs 35 and 55 are returned to their respective optical centers following the same steps described in the first embodiment.

While the stereo camera 2 is in a turned off state with the power switch 12 in the OFF position, the positions of the first and second CCDs 35 and 55 may move due to vibrations or the like. In such a case, it is necessary to return the first and second CCDs 35 and 55 to their respective optical centers when the power switch 12 is slid to the ON position. The above described simultaneous returning of the first and second CCDs 35 and 55 to their respective optical centers prevents the parallax deviations of a displayed through image (stereo image) immediately after the power is turned on.

Figure 9:
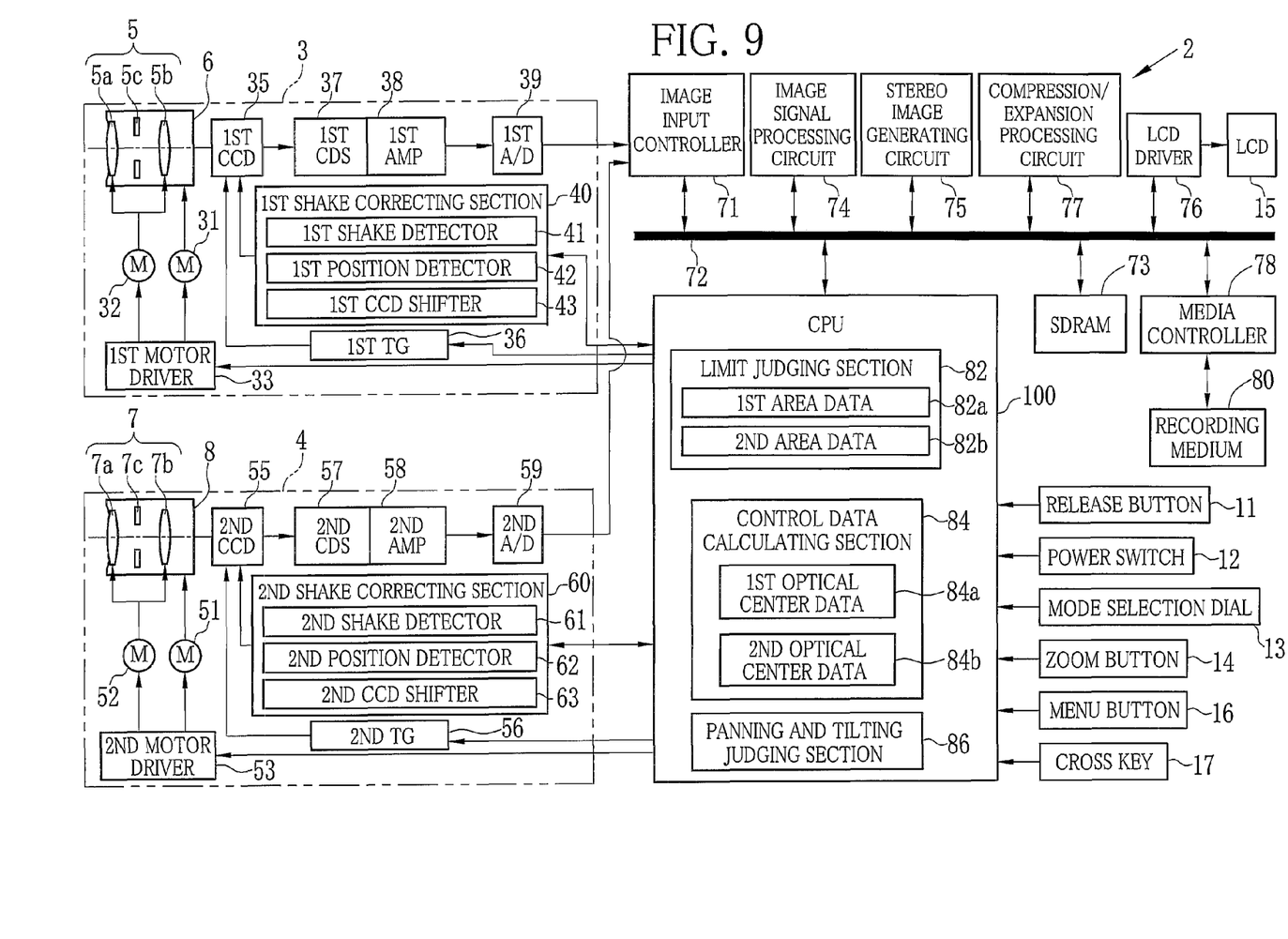
FIG. 9 is a block diagram for an embodiment in which panning and tilting are detected.
Figure 10:
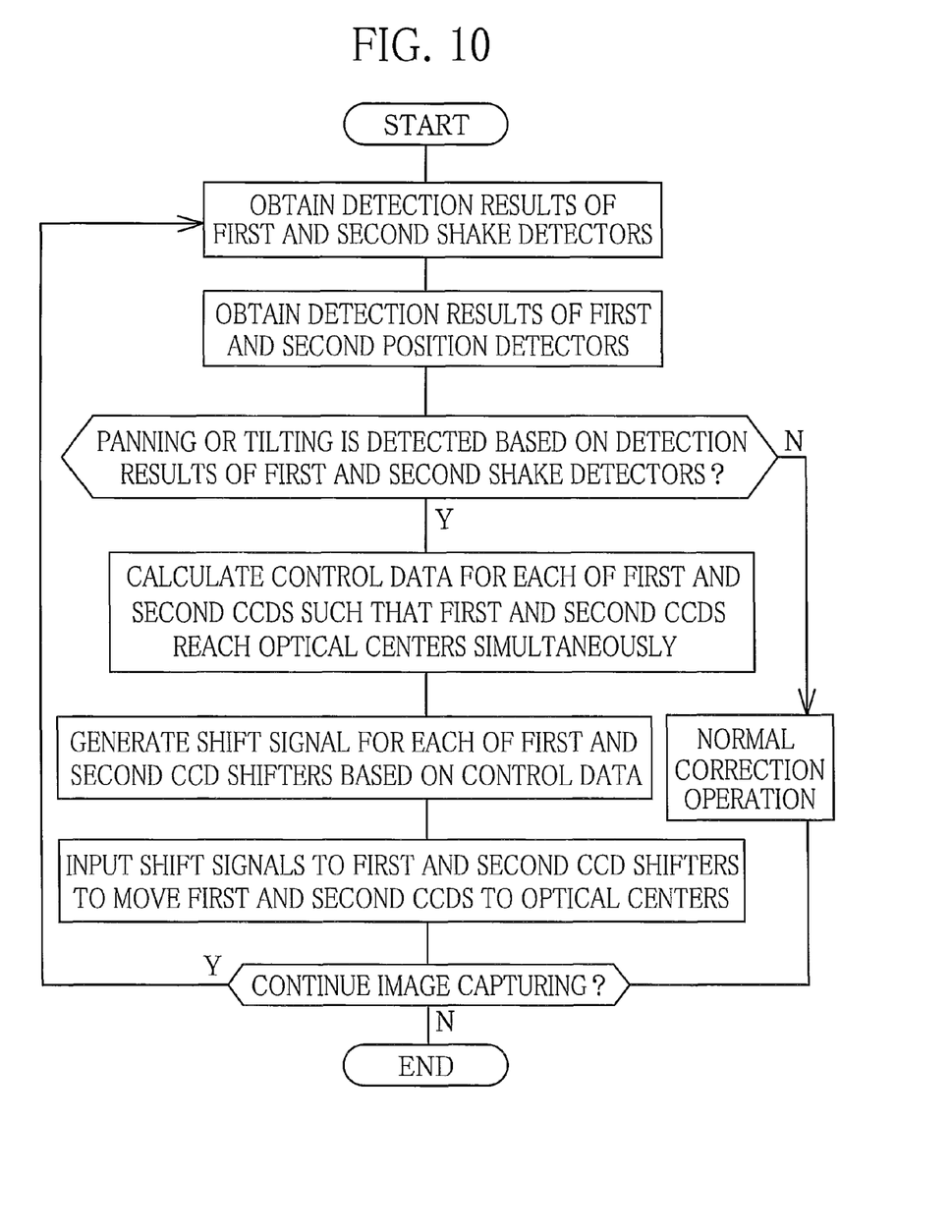
FIG. 10 is a flow chart showing steps for returning the first and second CCDs to their respective optical centers when panning and tilting are detected.
Figure 11A:
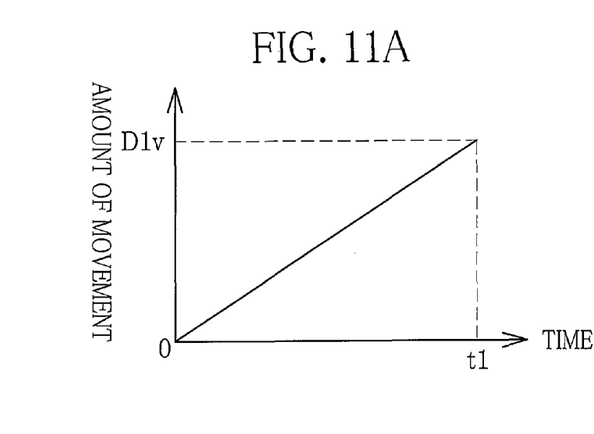
FIGS. 11A to 11D are explanatory views showing an example of linear control data.
Figure 11B:
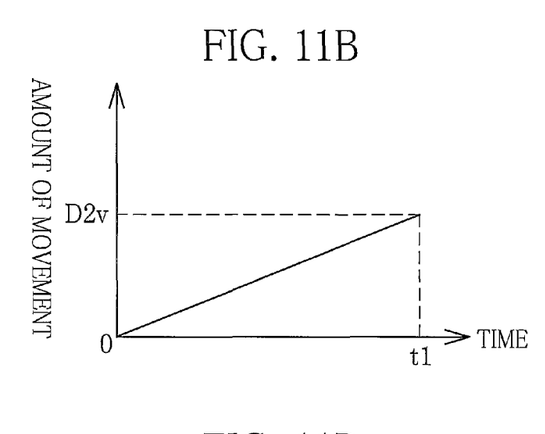
Figure 11C:
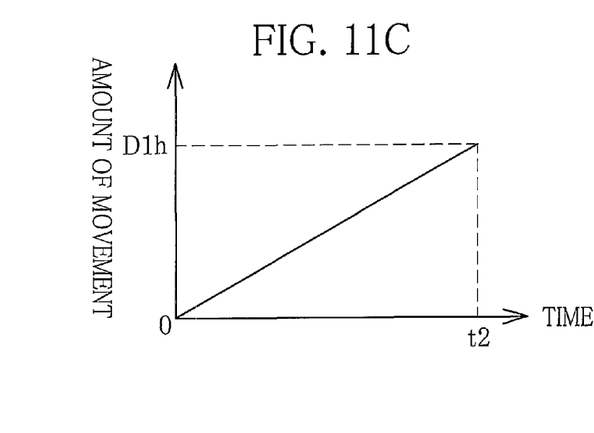
Figure 11D:
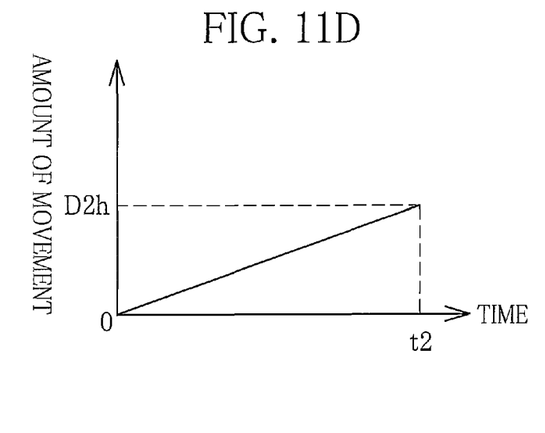
Figure 12A:
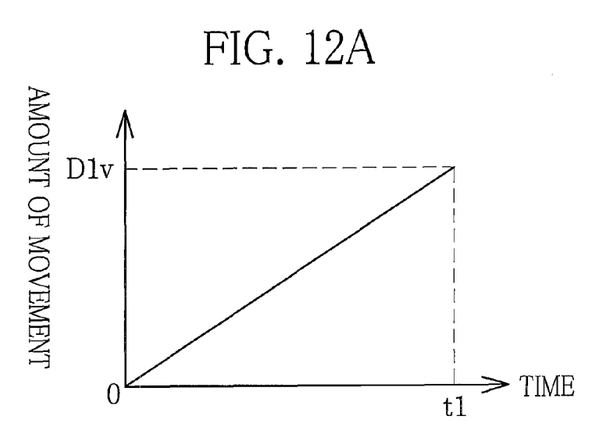
FIGS. 12A to 12D are explanatory views showing an example of control data for delaying one of the first and second CCDs.
Figure 12B:
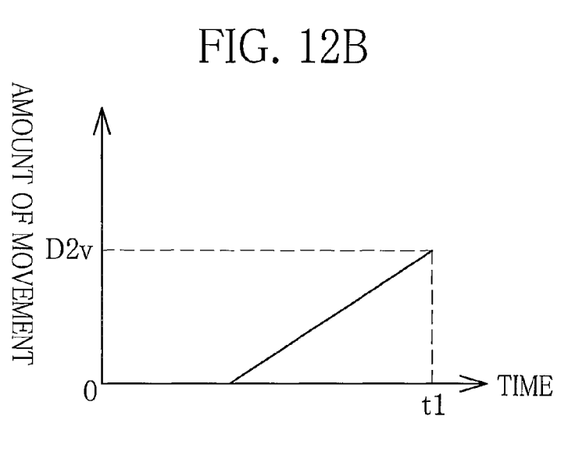
Figure 12C:
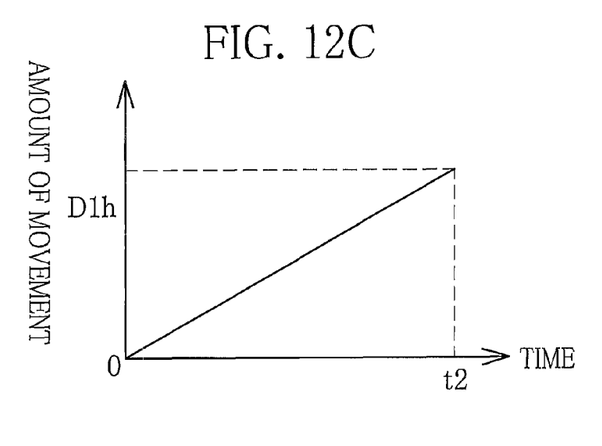
Figure 12D:
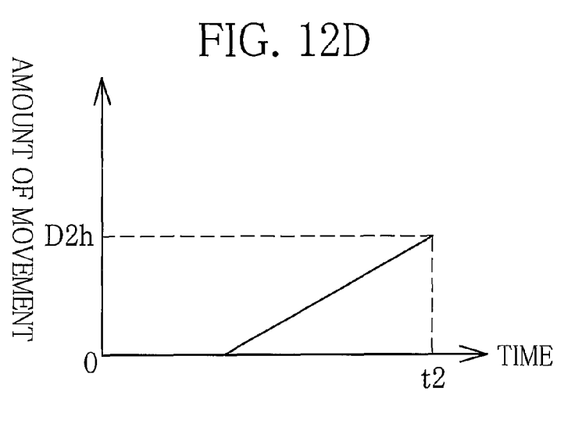

Next, with referring to FIGS. 9 and 10, a third embodiment of the present invention is described. As shown in FIG. 9, a CPU 100 of this embodiment is provided with a panning and tilting judging section 86 for judging whether panning or tilting is performed. When generating the shift signals for the first and second CCD shifters 43 and 63 based on the detection results of the first and second shake detectors 41 and 61 and the first and second position detectors 42 and 62, the CPU 100 inputs the detection results of the first and second shake detectors 41 and 61 to the panning and tilting judging section 86.

Based on the detection results of the first and second shake detectors 41 and 61, the panning and tilting judging section 86 judges that the panning or tilting is performed when uncorrectable motion different from a normal camera shake and with an amount of movement larger than a predetermined value is continuously generated in a constant direction over a predetermined time.

As shown in FIG. 10, when the panning and tilting judging section 86 judges that the panning or tilting is performed, the CPU 100 decides to return the first and second CCDs 35 and 55 to their respective optical centers. The CPU 100 inputs the detection results of the first and second position detectors 42 and 62 to the control data calculating section 84, and instructs the control data calculating section 84 to calculate the control data. Then, the CPU 100 returns the first and second CCDs 35 and 55 to their respective optical centers following the same steps as in the first embodiment.

As described above, it becomes possible to prevent erroneous correction of the motion of the first and second CCDs 35 and 55 caused by panning or tilting. Thus, the first and second CCDs 35 and 55 are returned to their respective optical centers based on the appropriate correction, and as a result, the parallax deviations in the stereo image are prevented.

In the above embodiments, the optical centers of the first and second imaging units 3 and 4 are used as the reference positions. The reference positions may be other positions as long as they are located within the correctable areas 92R and 92L.

In the above embodiments, each control data is calculated to form a cubic function curve in which amounts of the movement are small immediately after the start and immediately before the completion of the return. Alternatively, the amounts of movement may be changed linearly as shown in FIG. 11. Alternatively, as shown in FIG. 12, the start of the returning of one of the first and second CCDs 35 and 55 with the shorter distance to the optical center may be delayed until the other CCD with the longer distance to the optical center reaches a point where the distances from the CCDs 35 and 55 to the optical center become equal. Then, the first and second CCDs 35 and 55 are moved at the same speed, which facilitates the control of the first and second CCDs 35 and 55.

In the above embodiments, the LED 15 is a 3-D display provided with the lenticular lens on the surface, and the stereo image data of the lenticular lens method is generated. Alternatively, the LED 15 may be a 3-D display provided with a parallax barrier on the surface, and the stereo image data of the parallax barrier method may be generated. Alternatively, stereo image data of a polarized 3D display method using polarized 3D glasses may be used.

In the above embodiments, the present invention is applied to the image stabilization of the image sensor shift method with the use of the first and second CCDs 35 and 55 as the shake correcting sections as an example. Alternatively, the present invention may be applied to a lens shift method image stabilization using correction lenses as the shake correcting sections. In the above embodiments, the stereo camera having two imaging units, the first and second imaging units 3 and 4, is used. Alternatively, a stereo camera having three or more imaging units may be used.

When the digital camera rotates within a plane orthogonal to an imaging optical axis and its rotation center is off from a midpoint between the first and second imaging units 3 and 4, amounts of movements of the imaging units 3 and 4 differ from each other. To correct such movements, in the above-described embodiments, a shake detection sensor or shake detector is provided in each of the first and second imaging units 3 and 4. Generally, an X-direction shake detection sensor and a Y-direction shake detection sensor are used as the shake detection sensors, and therefore, four shake detection sensors in total are required. However, in order to cut cost, one pair of shake detection sensors (one X-direction shake detection sensor and one Y-direction shake detection sensor) may be disposed, for example, at the midpoint between the first and second imaging units 3 and 4 to detect camera shakes of both the first and second imaging units 3 and 4.

Various changes and modifications are possible in the present invention and may be understood to be within the present invention.

What is claimed is:

1. A digital camera including at least a first imaging unit and a second imaging unit, the first and second imaging units capturing images having parallax, the digital camera comprising:
A. the first imaging unit including:
a first corrector movable within a plane orthogonal to an optical axis of the first imaging unit; and
a first shifter for moving the first corrector from a first reference position and then returning the first corrector to the first reference position to correct a camera shake;

B. the second imaging unit including:
- a second corrector movable within a plane orthogonal to an optical axis of the second imaging unit; and
- a second shifter for moving the second corrector from a second reference position and then returning the second corrector to the second reference position to correct a camera shake;

C. a camera shake detector for detecting the camera shake; and

D. a controller for controlling actuation of the first and second shifters such that each of the first and second shifters responds to a signal from the camera shake detector when the first corrector moves from the first reference position and the second corrector moves from the second reference position, and such that the first and second correctors simultaneously reach the first and second reference positions, respectively, in returning, wherein the first imaging unit further includes a first position detector for detecting a position of the first corrector, and the second imaging unit further includes a second position detector for detecting a position of the second corrector, and wherein the controller calculates reference paths for the first and second correctors, through which positions, moving speeds, and acceleration of the first and second correctors are continuous from the start until the completion of the return, based on the positions of the first and second correctors at the start of the return, and the controller controls the actuation of the first and second shifters based on the calculated reference paths.

2. The digital camera of claim 1, wherein each of the first and second imaging units has a taking lens and an image sensor.

3. The digital camera of claim 2, wherein the camera shake detector is provided in each of the first and second imaging units.

4. The digital camera of claim 2, wherein each of the first and second correctors is the image sensor.

5. The digital camera of claim 2, wherein the first and second reference positions are optical axes of the first and second taking lenses, respectively.

6. The digital camera of claim 2, further including:
- a limit judging section for judging whether the first corrector has reached an edge of a first correctable area in which the camera shake is correctable and whether the second corrector has reached an edge of a second correctable area in which the camera shake is correctable; and
- wherein the controller actuates the first and second shifters to start returning the first and second correctors simultaneously when one of the first and second correctors reaches the edge of the corresponding correctable area.

7. The digital camera of claim 6, wherein the limit judging section has area data specifying each of the first and the second correctable areas, and judges whether the first or second corrector has reached the edge of the first or second correctable area based on the position of the first corrector detected by the first position detector, the position of the second corrector detected by the second position detector, and the area data.

8. The digital camera of claim 7, wherein the controller temporarily sets the first and second correctors to the first and second reference positions via the first and second shifters, respectively, when the power is turned on.

9. The digital camera of claim 2, further including:
- a panning and tilting judging section for judging whether panning or tilting is being performed based on detection results of the camera shake detector;
- and wherein the controller keeps the first corrector at the first reference position via the first shifter and the second corrector at the second reference position via the second shifter while the panning and tilting judging section judges that the panning or tilting is being performed.

10. The digital camera of claim 9, wherein the panning and tilting judging section judges that the panning or tilting is being performed when the camera shake detector detects a camera shake larger than a predetermined amount and in one direction for a predetermined time.

11. A method for controlling a digital camera, the digital camera including at least a first imaging unit and a second imaging unit, the first and second imaging units capturing images having parallax, the method comprising the steps of:
- detecting a camera shake;
- moving a first corrector of the first imaging unit from a first reference position and a second corrector of the second imaging unit from a second reference position in order to correct the camera shake, each of the first corrector and the second corrector moving within a plane orthogonal to an optical axis;
- simultaneously starting to return the first and second correctors when one of the first corrector and the second corrector has reached an edge of a correctable area in which the camera shake is correctable; and
- causing the first corrector to reach the first reference position and the second corrector to reach the second reference position simultaneously,
- wherein in the starting to return, reference paths for the first and second correctors, through which positions, moving speeds, and acceleration of the first and second correctors are continuous from the start until the completion of the return, are calculated based on the positions of the first and second correctors at the start of the return, and then the first and second correctors are moved based on the calculated reference paths.

12. The method of claim 11, further including the step of temporarily setting the first and second correctors to the first and second reference positions, respectively, when the power is turned on.

13. The method of claim 11, further including the steps of:
- judging whether panning or tilting is being performed; and
- keeping the first and second correctors at the first and second reference positions, respectively, while it is judged that the panning or tilting is being performed.

* * * * *